United States Patent [19]
Howard

[11] Patent Number: 5,450,746
[45] Date of Patent: Sep. 19, 1995

[54] CONSTANT FORCE STYLUS PROFILING APPARATUS AND METHOD

[75] Inventor: Lowell P. Howard, Gaithersburg, Md.

[73] Assignee: The University of North Carolina, Charlotte, N.C.

[21] Appl. No.: 134,927

[22] Filed: Oct. 12, 1993

[51] Int. Cl.[6] .................... G01B 07/34; G01B 21/30; H01J 37/26
[52] U.S. Cl. ..................................... 73/105; 250/306
[58] Field of Search .................... 250/306, 307, 423 F; 73/105

[56] References Cited

U.S. PATENT DOCUMENTS

| | | | |
|---|---|---|---|
| 5,015,850 | 5/1991 | Zdeblick et al. | 250/306 |
| 5,025,658 | 6/1991 | Elings et al. | 73/105 |
| 5,065,103 | 11/1991 | Slinkman et al. | 250/307 |
| 5,107,114 | 4/1992 | Nishioka et al. | 250/306 |
| 5,144,833 | 9/1992 | Amer et al. | 73/105 |
| 5,172,002 | 12/1992 | Marshall | 250/306 |
| 5,193,383 | 3/1993 | Burnham et al. | 73/105 |
| 5,210,410 | 5/1993 | Barrett | 250/306 |
| 5,253,515 | 10/1993 | Toda et al. | 73/105 |
| 5,266,801 | 11/1993 | Elings et al. | 250/307 |
| 5,304,924 | 4/1994 | Yamano et al. | 250/306 |
| 5,329,808 | 7/1994 | Elings et al. | 250/307 |
| 5,338,932 | 8/1994 | Theodore et al. | 250/306 |
| 5,345,815 | 9/1994 | Albrecht et al. | 250/306 |

OTHER PUBLICATIONS

*A Rocking Beam Electrostatic Balance for the Measurement of Small Forces*, G. L. Miller et al., Rev. Sci. Instrum. 62(3), Mar. 1991, pp. 705–709.

*A New Force Sensor Incorporating Force-Feedback Control for Interfacial Force Microscopy*, S. A. Joyce et al., Rev. Sci. Instrum., vol. 62, No. 3, mar. 1991, pp. 710–715.

*Rocking-Beam Force-Beam Approach to Atomic Force Microscopy*, D. A. Grigg et al., Ultramicroscopy, 1991, pp. 1504–1508.

*A Scanning Tunneling Microscope with a Capacitance-Based Position Monitor*, J. E. Griffith et al., J. Vac. Sci. Technol. B8(6), Nov./Dec. 1990, pp. 2023–2027.

*Resonant Phase Shift Technique for the Measurement of Small Changes in Grounded Capacitors*, G. L. Miller et al., Rev. Sci. Instrum. 61(4), Apr. 1990, pp. 1267–1272.

*Force Microscopy with a Bidirectional Capacitance Sensor*, G. Neubauer et al., Rev. Sci. Instrum. 61(9), Sep. 1990, pp. 2296–2308.

*Long Range Constant Force Profiling for Measurement of Engineering Surfaces*, Howard et al., Rev. Sci. Instrum. 63(10), Oct. 1992, pp. 4289–4295, including letter regarding publication.

*Primary Examiner*—Hezron E. Williams
*Assistant Examiner*—George M. Dombroske
*Attorney, Agent, or Firm*—Bell, Seltzer, Park & Gibson

[57] ABSTRACT

A stylus profiling apparatus and method maintains constant separation, and thus constant force, between a conductive cantilever beam which extends over a conductive portion of a base and which is positioned in spaced apart relation therefrom. In particular, a piezoelectric actuator is coupled to the base and is controlled to move the base relative to the free end of the cantilever beam so as to maintain constant spacing, and thus constant force, therebetween when a stylus on the free end is moved by a surface profile. A capacitor having a pair of plates, at least one of which is coupled to the piezoelectric actuator, produces an electrical signal in response to the displacement of the actuator to provide measurement of the surface profile. The base is preferably of trapezoidal cross section and includes electrical pads on one side thereof. A probe holder includes a mating shoulder and electrical contacts for cooperatively mating with the electrical pads. Thus, the probe may be slidably removed from the holder and a new probe may be slid into the holder to allow rapid removal, replacement and alignment.

27 Claims, 6 Drawing Sheets

CONSTANT FORCE STYLUS PROFILING APPARATUS AND METHOD

FIELD OF THE INVENTION

This invention relates to the field of metrology, and more particularly to surface profile measurement systems and methods.

BACKGROUND OF THE INVENTION

State of the art research, development and manufacturing often requires accurate measurement of small mechanical displacements. For example, in the design and manufacture of engineered microstructures, accurate surface profile measurements of these microstructures is often required. Stylus profiling instruments are important tools used by the optics, microelectronics, precision machining and other industries for nanometer scale surface metrology. A stylus profiling instrument typically includes a stylus tip which is scanned across a surface profile. The displacement of the stylus tip is measured to measure the surface profile of the scanned surface.

Stylus profiling instruments often mount the stylus on the free end of a cantilever and measure the displacement of the cantilever to obtain a surface profile. Cantilever stylus profiling instruments are described in U.S. Pat. No. 5,015,850 to Zdeblick et al. entitled *Microfabricated Microscope Assembly*; U.S. Pat. No. 5,193,383 to Burnham et al. entitled *Mechanical and Surface Force Nanoprobe*; a publication by Neubauer et al. entitled *Force Microscopy with a Bidirectional Capacitance Sensor*, Review of Science Instrumentation, Vol. 61, No. 9, September 1990, pp. 2296-2308; and a publication by Miller et al. entitled *Resonant Phase Shift Technique for the Measurement of Small Changes in Grounded Capacitors*, Review of Scientific Instrumentation, Vol. 61, No. 4, Apr. 1990, pp. 1267-1272. In these cantilever stylus profiling instruments, capacitors are often used for position sensing, and piezoelectric actuators are often used for moving the scanning stage and/or cantilever. Another publication which describes a capacitance based position monitor is *A Scanning Tunneling Microscope with a Capacitance-Based Position Monitor* by Griffith et al., Journal of Vacuum Science Technology, Vol. B8, No. 6, November/December 1990, pp. 2023-2027.

Other stylus profiling instruments use a "rocking-beam" force balance system in which the stylus is placed at one end of the beam which rocks on a central support. Rocking beam stylus profiling instruments are described in a publication by Grigg et al. entitled *Rocking-Beam Force-Balance Approach to Atomic Force Microscopy*, Ultramicroscopy, Vol. 42-44, 1992, pp. 1504-1508; a publication by Joyce et al. entitled *A New Force Sensor Incorporating Force-Feedback Control for Interfacial Force Microscopy*, Review of Science Instrumentation, Vol. 62, No. 3, March 1991, pp. 710-715; and a publication by Miller et al. entitled *A Rocking Beam Electrostatic Balance for the Measurement of Small Forces*, Review of Science Instrumentation, Vol. 62, No. 3, Mar. 1991, pp. 705-709. As described in the Grigg et al. article, the rocking beam may be configured to provide air damping. Rocking beam stylus profiling instruments also use capacitive measurement techniques and piezoelectric actuators. It is also known to use capacitive measurements to overcome hysteresis effects and accurately measure the position of a piezoelectric actuator.

The cantilever displacement in a stylus profiling instrument may also be measured optically. See for example, U.S. Pat. Nos. 5,025,658 to Elings et al. entitled *Compact Atomic Force Microscope*; 5,144,833 to Amer et al. entitled *Atomic Force Microscopy*; and 5,210,410 to Barrett entitled *Scanning Probe Microscope Having Scan Correction*.

Notwithstanding the widespread use of stylus profiling instruments and methods, there continues to be a need for nanometer scale stylus profiling instruments and methods which have low contact force. Low contact force is important in order to prevent damage to fragile microengineered surfaces. It is also important to be able to obtain a surface profile over long ranges of operation, on the order of tens of millimeters, so as to accurately evaluate surface form and finish in accordance with international profiling standards. It is also well known that stylus tips and cantilevers often require replacement, as a result of wear and breakage. In designing a stylus profiling instrument, it is important to allow the tip and cantilever to be easily and rapidly removed, replaced, and realigned.

SUMMARY OF THE INVENTION

The present invention is a stylus profiling apparatus and method for measuring a surface profile. The stylus profiling apparatus and method uses a conductive cantilever beam which extends over a conductive portion of a base and which is positioned in spaced apart relation therefrom. A stylus tip is mounted at the free end of the cantilever beam for movement by a surface profile. Actuating means, such as a piezoelectric actuator, is mechanically coupled to the base for moving the base relative to the free end of the cantilever.

According to the invention, constant spacing maintaining means is electrically connected to the conductive base portion and the conductive cantilever beam to control the actuating means to move the base relative to the free end of the cantilever beam so as to maintain constant spacing, and thus constant force, therebetween when the stylus is moved by the surface profile. Displacement indicating means, such as a capacitor having a pair of plates at least one of which is coupled to the actuating means, produces an electrical signal in response to the displacement of the actuating means to provide measurement of the surface profile.

The surface profile measuring apparatus of the present invention provides low contact forces because constant spacing, and therefore constant force, is maintained between the cantilever and its base during surface profile scanning. Preferably, the constant spacing is the "at rest" spacing of the unloaded cantilever. Accordingly, high contact forces are not produced. Moreover, the electrical signal which provides measurement of the surface profile is obtained by independently measuring the displacement of the piezoelectric actuator. Accordingly, hysteresis effects and nonlinear driving effects of the piezoelectric actuator are reduced or eliminated, so that accurate surface profiling is obtained.

In a preferred embodiment of the present invention, the constant spacing maintaining means includes a capacitive gage which is connected to the conductive base portion and the conductive cantilever beam, and an electronic controller such as a proportional-integral-derivative (PID) controller for driving an actuator controller which controls movement of the actuator in a feedback loop to provide constant spacing between the cantilever and base. The displacement indicating means is preferably a capacitor which is internal to the piezoelectric actuator. The internal capacitor provides an accurate indication of displacement of the piezoelectric actuator and is independent of the drive signal which is applied to the actuator by the actuator controller. The displacement indication signal is also independent of hysteresis of the piezoelectric actuator.

The cantilever and base are also preferably designed to have an overlapping area which is large enough, and a spacing which is small enough, so as to trap a layer of air between the base and cantilever. Mechanical damping of the cantilever beam by the trapped "squeeze film" of air is thereby provided upon movement of the stylus tip by a surface profile. Cantilever overshoot and oscillation are thereby reduced.

In a method according to the present invention, a surface profile is measured using a conductive cantilever beam which extends over a conductive portion of a base and having a stylus tip at the free end of the cantilever beam, by electronically controlling an actuator to move the base relative to the free end of the cantilever, so as to maintain constant spacing between the base and cantilever when the stylus is moved by the surface profile. An electric signal is produced in response to the displacement of the actuator to obtain measurement of the surface profile. The electric signal is produced independent of the drive signal to the actuator.

The stylus, cantilever, and base assembly, collectively referred to as a "probe", is easily and rapidly removed, replaced and aligned to the stylus profiling instrument by providing automatic electrical and mechanical alignment of the probe relative to a probe holder upon placing a probe in the probe holder. In particular, the base includes a top surface and first and second side surfaces on opposite ends of the top surface. The base also includes a mesa on the top surface. A conductive cantilever beam, having a fixed end and a free end, is fixedly attached to the mesa, with the conductive cantilever beam extending over the top surface in spaced apart relation therefrom. A stylus tip is provided on the conductive cantilever beam, adjacent the free end thereof.

A first conductive coating is provided on the top surface, extending onto a first portion of the first side surface to produce a first electrical pad. A second conductive coating extends from the fixed end of the cantilever beam, across the mesa and onto a second portion of the first surface to produce a second electrical pad.

The probe holder includes a shoulder for cooperatively mating with the second side surface of the base, and first and second electrical contacts positioned in the holder so as to electrically and mechanically contact the first and second electrical pads when the second side surface is mated with the shoulder. Thus, the probe may be slidably removed from the holder and a new probe may be slid into the holder so as to cooperatively mate the shoulder with the second side surface and the electrical contacts with the electrical pads. Rapid removal, replacement and alignment are provided.

The substrate preferably has a trapezoidal cross section wherein the top surface is the shorter one of the parallel trapezoidal sides, and the first and second surfaces are the pair of nonparallel trapezoid sides. Thus, the substrate may be slid into the probe holder, in a direction transverse to the trapezoidal cross section, to automatically align the probe relative to the holder and provide electrical contact. Simplified replacement and alignment is thereby provided.

A low force stylus profiling method and apparatus according to the invention can be used in combination with any probe/holder configuration. Similarly, a probe/holder configuration according to the invention may be used with any stylus profiling method and apparatus. However, preferably, a probe/holder configuration according to the invention is used in combination with a constant force stylus profiling apparatus and method according to the invention to provide a low contact force, highly accurate system, which is easily repaired.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Figure 1:
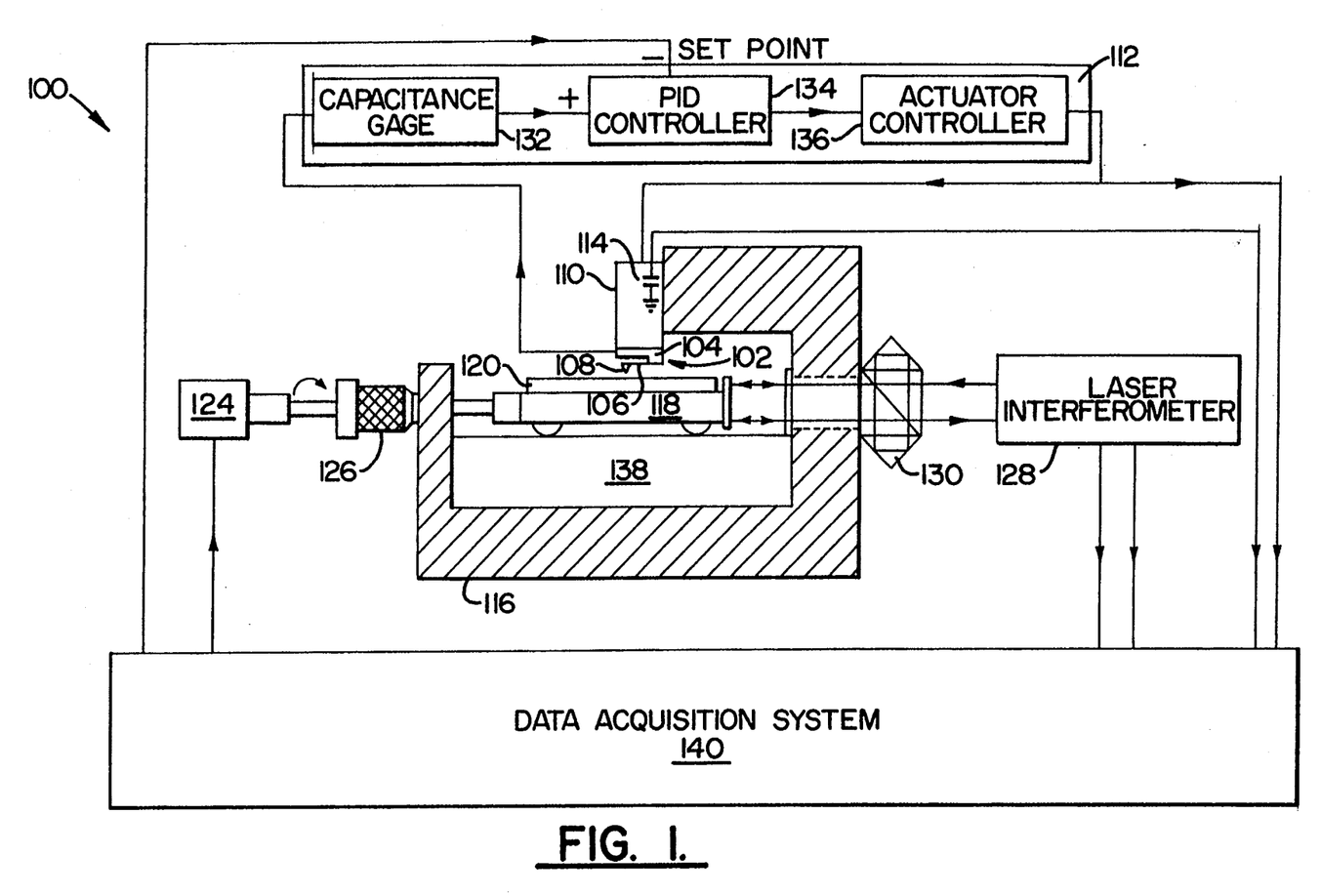
FIG. 1 illustrates a schematic block diagram of a surface profiling apparatus according to the present invention.

Referring now to FIG. 1, a schematic block diagram of an instrument or apparatus for measuring a surface profile according to the present invention is shown. As shown, surface profile measuring apparatus 100 measures a surface profile of a specimen which is mounted on specimen platform 120. Specimen platform 120 is mounted on a carriage 118 which is traversed on a high precision slideway 138. Distances of up to 20 mm or more may be traversed. The slideway 138 is mounted on an instrument frame 116. The carriage 118 is driven by a motor 124 and micrometer drive 126. Position of the carriage 118 relative to the instrument frame 116 is measured by a plane mirror polarization laser interferometer 128 via double pass optics 130, to provide a trigger signal for sampling of the probe output at constant spatial intervals.

Still referring to FIG. 1, surface profiles of a specimen on specimen platform 120 are measured by a force probe 102 acting in the vertical direction (the "z" axis) and perpendicular to the motion of the carriage 118 (the "x" axis). The probe 102 includes a stylus tip 108 attached to the free end of a conductive cantilever beam 106. A base 104, including a conductive base portion (not illustrated in FIG. 1), lies adjacent the cantilever beam 106 so that the cantilever beam 106 extends over the base 102 and is positioned in spaced apart relation therefrom. Thus, the conductive portion of base 104 and the conductive cantilever beam 106 form a capacitor which can be used to sense the beam's distortion or displacement and thus, indirectly, force.

The output of the capacitor formed of the conductive base portion and the conductive cantilever, is maintained at constant value by constant spacing maintaining means 112. As shown in FIG. 1, constant spacing maintaining means 112 is electrically connected to the conductive portion of base 104 and to the conductive cantilever beam 106. Constant spacing maintaining means 112 includes a capacitance gage 132, and a feedback controller such as a conventional proportional-integral-derivative (PID) controller 134. The output of PID controller 134 is connected to an actuator controller 136.

Actuator controller 136 is connected to an actuator 110 to provide an actuator drive signal thereto. Actuator 110 is mechanically coupled to base 104 so as to move the base 104 relative to the free end of the cantilever beam 106. Actuator 110 is preferably a piezoelectric actuator such as a Queensgate Instruments Digital Piezoelectric Translator (DPT) manufactured by Queensgate Instruments, Ltd., Silwood Park, Ascot, Berkshire, England. Other conventional piezoelectric actuators may be used. The piezoelectric actuator 110 contains an integral capacitive sensor system 114 to monitor the actuator's actual displacement. Thus, internal capacitor 114 provides displacement indicating means, for producing an electrical signal which is responsive to displacement of the actuator 110. The indicating means provides surface profile measurements which are independent of the hysteresis effects and nonlinear driving effects of actuator 110, because they are independent of the actuator drive signal.

As stated above, actuator 110 is preferably a Queensgate Instruments Digital Piezo Translator (DPT) or a similar piezoelectric actuator. This actuator consists of a PZT stack with preloaded Invar end caps. Extension of the actuator is monitored by an internal capacitance gage 114. The electrodes of this internal gage are deposited on Zerodur rods attached to the Invar end caps and located along the central axis of the tubular PZT stack. By using the capacitance gage output in a feedback loop, a servo system is able to remove hysteresis and creep from the PZT movement. Virtual separation of the force and measurement loops makes this actuator extremely stiff along its axis, and exceptionally stable with temperature. An analog input is provided that allows the internal setpoint of the PID controller 134 to be changed, causing a change in the length of the piezostack. Half-power bandwidth of the actuator system is approximately 500 Hz. Tests have shown the stability of the piezoelectric actuator to be of the order of 50 pm under environmentally stable conditions.

Using closed loop feedback, the actuator controller 136 compensates for piezoelectric hysteresis and creep to a bandwidth of 300 Hz and a slew rate of 1 $\mu$m/ms. By using the actuator 110 to maintain a constant deflection, and thus force, on the cantilever, a profile of constant force will be generated by displacement indicating means 114 as the specimen is traversed under the probe system. The set point of the PID controller 134 is preferably set so that the constant displacement corresponds to the "at rest" or unloaded displacement of cantilever beam 106. The resulting constant force is thus very low. A data acquisition system 140, such as a personal computer including a data acquisition board, is used to store profile and carriage position information, and to control motor drive 124, set point of PID controller 134 and laser interferometer 128.

The PID controller 134 is a conventional three term or PID controller. After normalizing the capacitance gage 132 output signal to yield unity gain for an equivalent DPT drive signal, the controller is tuned using conventional Ziegler-Nichols tuning parameters. Further manual adjustments to the derivative and proportional terms may be made to minimize noise. Maximum time constants may be tailored to not exceed the slew rate of the DPT and a rate limiter may be used on the output of the differential term.

Figure 2:
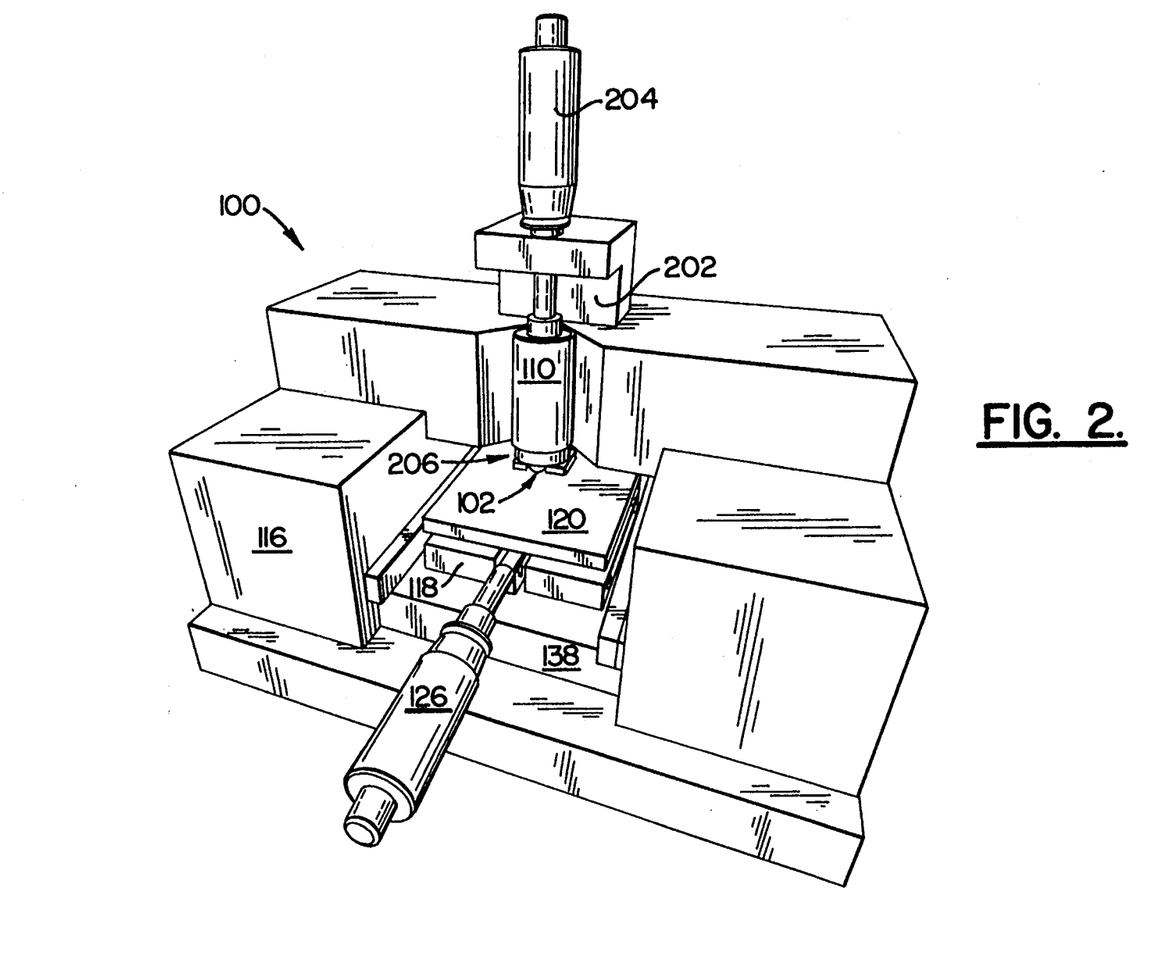
FIG. 2 illustrates a schematic perspective view of the surface profile measuring apparatus of FIG. 1.

Referring now to FIG. 2, a schematic perspective view of surface profile measuring apparatus 100 is shown. FIG. 2 illustrates frame 116, slideway 138, carriage 118, drive micrometer 126, specimen platform 120, probe 102 and actuator 110, as already described in connection with FIG. 1. A probe holder 206, described below, is also shown.

Before a surface profile can be measured, setup is required. First, the specimen is mounted onto the specimen platform 120 of the carriage 118. The probe 102 which is initially retracted clear of the specimen, is positioned in contact with the specimen surface until the servosystem brings the actuator 110 to its midrange position, with the piezoelectric element approximately halfway between fully extended and fully retracted. This coarse approach is achieved by manually moving the complete probe system along a friction slideway using a mechanical coarse approach micrometer 204 and hysteretic coupling 202 described below.

When in position, the micrometer 204 is retracted until it is no longer in the measurement loop. The carriage is then traversed using the drive micrometer 126 through a noninfluencing single degree of freedom mechanical coupling. A precise tilt mechanism on the underside of the specimen platform 120, described below, is used to ensure that the surface remains within the probe's dynamic range over long traverse distances of up to 20 mm or more.

Position of the carriage is monitored by a standalone polarization laser interferometer 128 (FIG. 1) so that a datum position can be defined and, once set, will remain until reset or the power is removed.

Frame 116 is preferably a solid aluminum frame. Aluminum is preferably used for its combination of favorable thermal and mechanical properties and ease of manufacture. As will be understood by those having skill in the art, there are two approaches for the selection of materials for thermal expansion properties in precision instruments. The first uses ultralow thermal expansion coefficient materials such as Zerodur glass ceramic, fused silica and Invar alloy with the goal of minimizing thermal effects. The second approach uses inexpensive and easy to machine materials such as aluminum and copper. Such metals have high thermal diffusivities to rapidly dissipate the effects of thermal shock resulting from manual operations, and therefore minimize settling times. The latter approach usually requires the instrument to be in a temperature controlled environment.

To further reduce thermal gradients in the instrument frame, all joints are preferably bolted together with a thin layer of silicone heat transfer grease at the interface. The use of epoxies, with their low thermal conductivity and diffusivity, even though spread in a very thin layer, can impede the distribution of heat in the frame. The instrument is preferably operated in an environmentally controlled laboratory maintained at an average temperature of 20°± 0.1° C. and 40±5% relatively humidity, which is typical of most metrology facilities. All components may be open to ambient air and no housing or box of any kind is necessary to surround the aluminum instrument frame.

The complete instrument 100 sits on four 6 mm thick by 10 mm diameter rubber feet on a heavy granite surface plate, dimensions 1 m×1 m×250 cm. The surface plate is supported on a standard steel frame by four leveling feet with rubber pads on the bottom. No other vibration isolation need be used.

Figure 3:
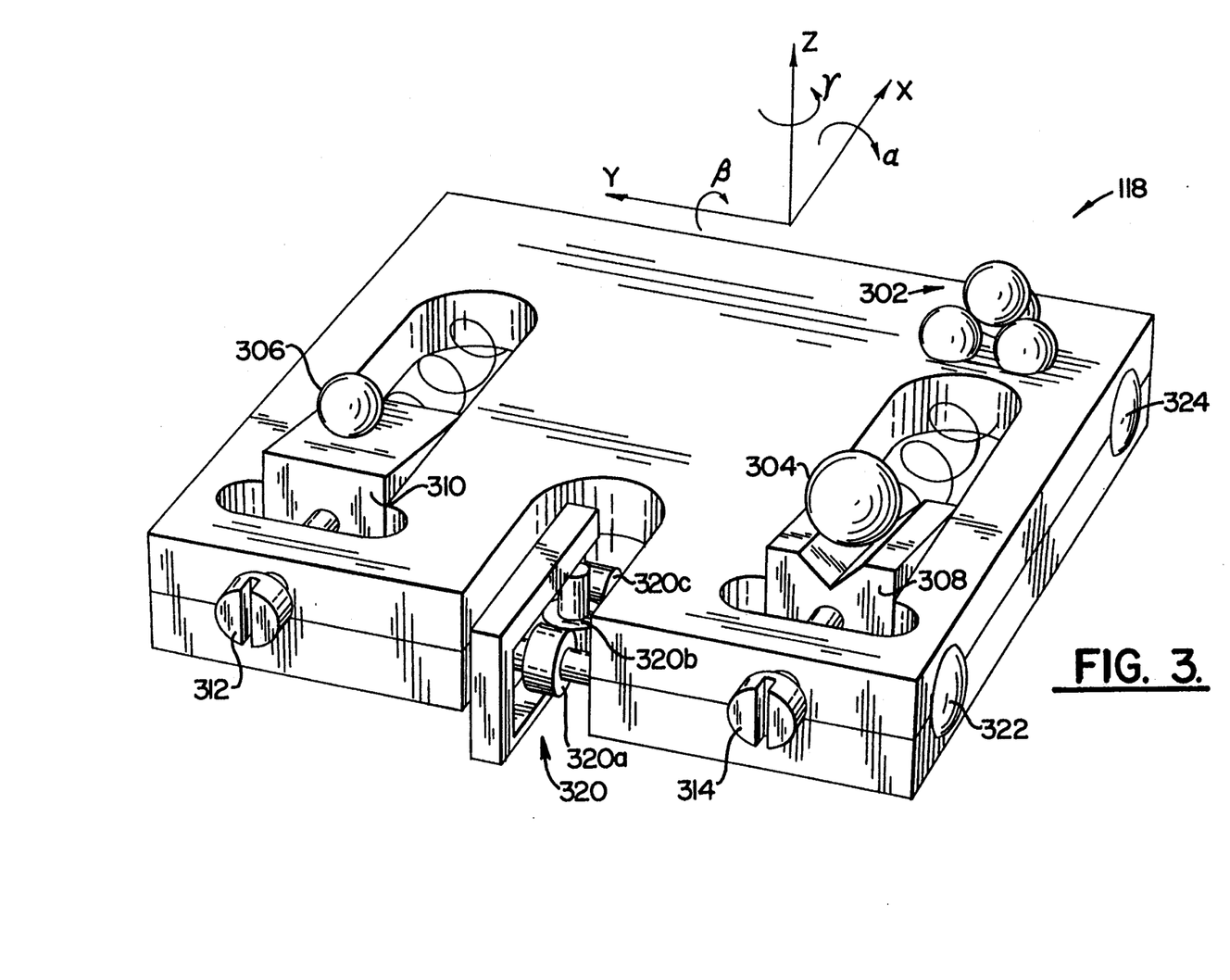
FIG. 3 illustrates an exploded perspective view of a carriage for the surface profiling apparatus of FIG. 1.

Referring now to FIG. 3, an exploded perspective diagram of the carriage 118 of FIG. 1 is shown. The specimen platform 120 has been removed for clarity. Normally, the specimen platform 120 is rigidly bonded to three kinematic ball mounts 302, 304 and 306, and maintained in contact with the carriage by a simple tension spring (not shown). The specimen platform 120 rotates about the balls 302, which is contacted in a three point kinematic support to allow freedom of rotation on all three axes. The other two balls, 304, 306 rest on adjustable wedges 308, 310 respectively.

Ball 304 rests on a V-groove wedge 308 and ball 306 rests on a flat wedge 310, that provide the other three constraints required for kinematic clamping of the platform. The wedge angle on both wedges 308 and 310 is 26 mrad. Tilt is achieved by sliding the wedges 308 and 310 in the x-axis direction using manual adjustment screws 312 and 314. These screws are rounded on the ends to provide small area contacts and are preloaded by coil springs which also provide the return mechanism. Both screws 312 and 314 are preferably of 0.5 mm pitch and the balls 304 and 306 are separated by a distance of 50 mm giving a tilt adjustment sensitivity of 0.26 mrad per turn. For equal edge angles in both adjusters, a rotation in the y-axis (pitch adjustment) about the center of ball 302 is achieved by similar adjustment of screws 312 and 314. Adjustment of screw 312 will result in a rotation about the x-axis (roll adjustment) with variable adjustment between these two.

The noninfluencing coupling between the micrometer drive spindle and the carriage includes three crossed rollers as illustrated generally at 320. Each roller is on the outside race of a radial ball bearing. Two of these rollers 320a, 320c are attached to the carriage through the central race and aligned along the y-axis. The third roller 320b is originally attached through its central race to the drive micrometer spindle and is aligned in the vertical or z-axis. Roller 320b sits centrally between the other two rollers 320a, 320c with a small clearance for hysteresis.

As the micrometer is advanced or retracted, the outer races will make contact forming a circular interface of, similar nature to that between a sphere and a flat. From a practical point of view, this produces a point contact with infinite stiffness in the direction normal to the contact and unconstrained in the other five freedoms. Upon reversal of direction, a micrometer roller then contacts the opposing roller. Thus, there will be a finite hysteresis in this coupling which is not of significance since the carriage motion is monitored by the interferometer 128.

The three lead/PTFE composite bearings 302, 304 and 306 are bonded to the underside of the carriage which then rests on a BK7 flat window (to λ/10) to form the rectilinear slide. Five degree of freedom kinematic constraints is achieved by bonding two more bearings 322 and 324 to the side of the carriage 118 which is then forced by light BeCu springs to follow the surface of a float glass reference bonded to the instrument frame with its plane orthogonal to both the optical flat and the drive axis. While the flatness of the float glass is an order of magnitude worse than that of the main optical flat, it is along an axis normally not considered important in stylus operation. It will be understood that the vast majority of nanometric stylus instruments trace an arcuate path, not a straight line. While the carriage may suffer from several microns of lateral error, its motion is repeatable. The design of carriage systems is well known to those having skill in the art and need not be described further herein.

The laser interferometer 128 and optics 130 of FIG. 1 will now be described. Traditionally, stylus instruments have not emphasized metrology of the traverse axis. In apparatus 100, however, carriage position is monitored by a plane mirror interferometer 128. This allows the moving mirror to be much smaller and lighter in weight than a comparably sized corner cube retroreflector, an important consideration on a small carriage. An additional advantage is that the laser measurement axis is collinear with the carriage drive, with a small Abbe offset from the probe tip. Mounting the interferometer optics 130 on the frame 116 results in a short, stiff structural loop and a dead path amounting to less than 70 mm. The laser interferometer 128 is also preferably mounted on a pylon extending from the surface plate base, decoupling this potentially troublesome heat source from the frame 116. Independent interferometer counting circuits are used as the clocking mechanism for data acquisition of the force profile signal, allowing repeatable measurements over the same trace to be compared directly.

Figure 4:
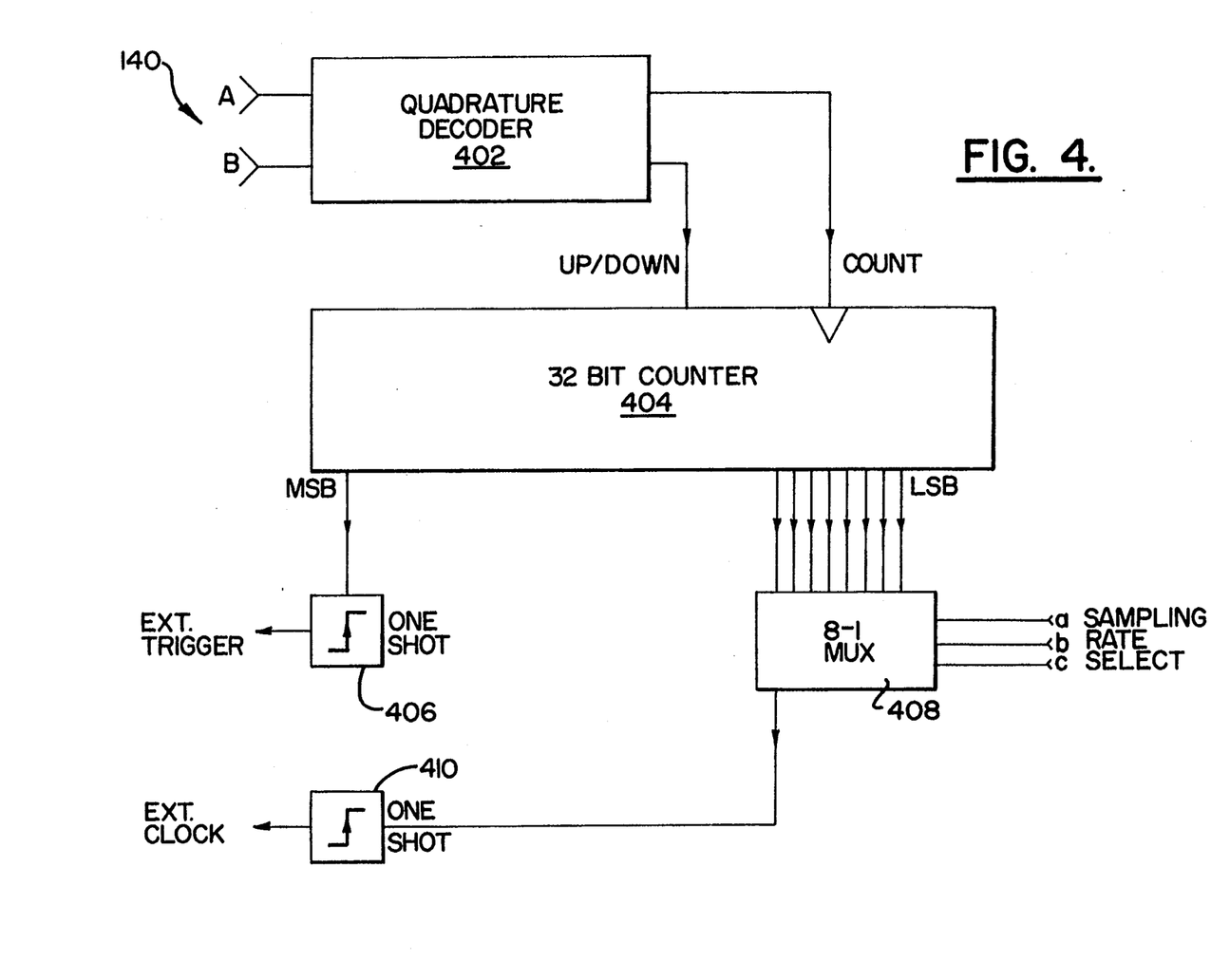
FIG. 4 is a schematic block diagram of a portion of the data acquisition system for the stylus profiling apparatus of FIG. 1.

Laser interferometer 128 preferably includes a quarter wave plate for mixing, and four PIN diodes to monitor the beam intensity after passing through polarizers at angles of −45, 0, 45° and 90°. The four signals generated correspond to sin, −sin, cos and −cos functions which are then subtracted from each other by analog instrumentation amplifiers to produce two signals in phase quadrature. These signals are processed by data acquisition system 140, a portion of which is illustrated in FIG. 4. Referring to FIG. 4, these signals are referred to as A and B. The AB quadrature signals are then processed by a 4X quadrature decoder 402 which produces a direction signal (labelled "up/down" in FIG. 4), and a Count signal, on each zero crossing. These signals drive a 32 bit counterchain 404 utilizing the most significant bit (MSB) of the counter as a sign bit in an offset binary scheme. In operation, the counter 404 is reset to zero defining a datum point at the beginning of the profile location. After a small carriage windup past the datum, the profile sequence is initiated. Upon reaching the zero position, the sign undergoes a state reversal which is used to actuate the external trigger input via one shot 406. Pulses for the external clock input are derived by selecting one of the lowest eight bits from the 32 bit position counter via multiplexor 408 and one shot 410. In this fashion, sampling rates may be reflected at intervals which are $2^n$ of the basic clocking rate of 39.55 nm.

Figure 5:
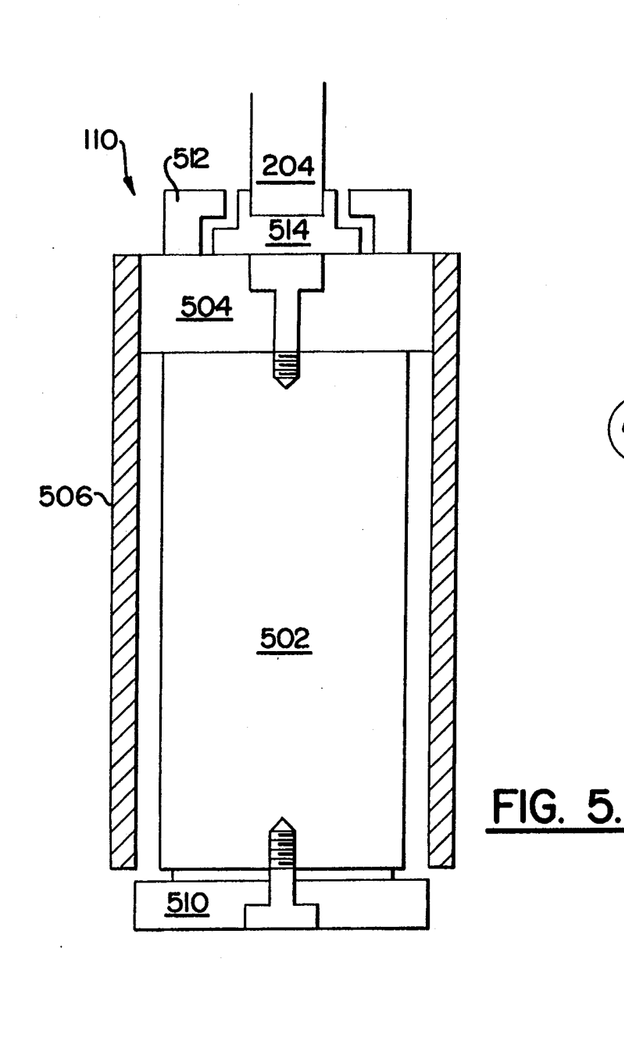
FIG. 5 illustrates a cross sectional view of an actuating means for the surface profiling apparatus of FIG. 1.

Referring now to FIG. 5, a cross sectional view of actuating means 110 is shown. The DPT piezoelectric actuator 502 is attached to an Invar plug 504 which is then bonded into a fused silica tube 506 so that its head protrudes from the other end of the tube. This tube is then secured in a vertical V-groove by a leaf spring (not shown) with sufficient force to prevent the tube from sliding under gravitational and inertia loads, but low enough to enable sliding upon application of a reasonable force. The forces of static friction are enough to keep the tube 506 locked firmly into place after the micrometer head is withdrawn from contact. Actuator head 510 forms part of the probe holder 206, shown in FIG. 2 and described in detail in connection with FIG. 6.

Still referring to FIG. 5, also attached to the Invar base 504 is a circularly symmetric T-shaped coupling 512. This coupling is attached to a 25 mm range course approach micrometer 204 via hysteretic coupling 514. The hysteresis in coupling 514 enables positioning of the probe system in the vertical plane by pushing on the front face or pulling against the back. Alternatively, the micrometer 204 can be wound to a point midway between these two extremes so that it is no longer in contact and therefore has little influence on the measurement. Removal of the micrometer head 152 from the measurement loop is important because of the large thermal transients generated in the micrometer barrel each time it is touched by an operator's hands.

Figure 6:
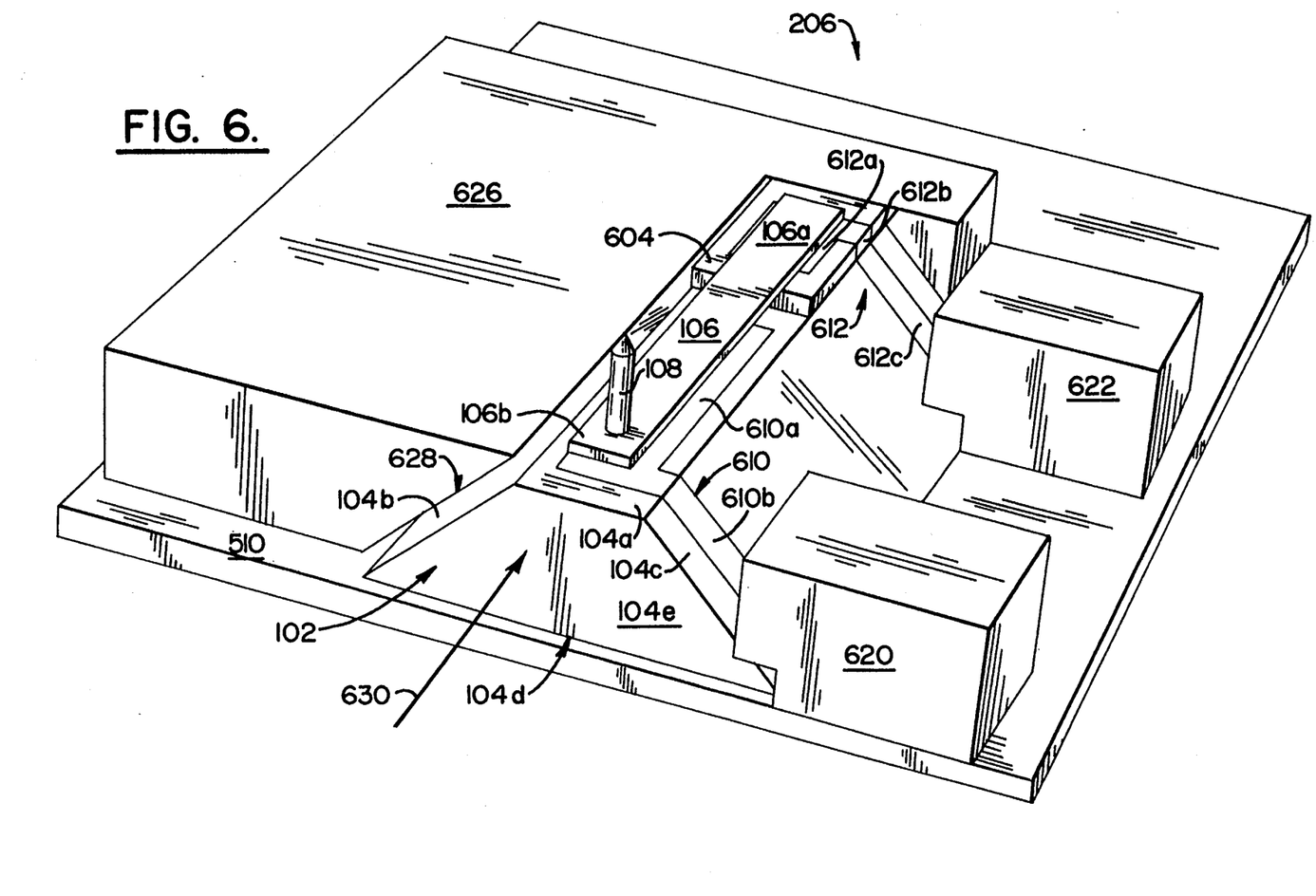
FIG. 6 is a schematic perspective view of a probe and probe holder for the surface profiling apparatus of FIG. 1.

Referring now to FIG. 6, the probe 102 and probe holder 206 are shown. Probe holder 206 includes actuator head 510, slide 626 and electrical contacts 620 and 622, as will be described below.

As already described, probe 102 includes a base 104, a cantilever beam 106 and a stylus tip 108 at the free end 106b of cantilever 106. In particular, base 104 includes a top surface 104a and first and second side surfaces 104b and 104c at opposite ends of the top surface. A mesa 604 is also included on the top surface 104a. The fixed end 106a of cantilever beam 106 is fixedly attached to the mesa 604 so that cantilever 106 extends over the top surface in spaced apart relation therefrom.

As shown in FIG. 6, base 104 is preferably of trapezoidal cross section with a pair of opposing parallel sides 104a, 104d, a pair of opposing nonparallel sides 104b, 104c and a pair of opposing end faces, one of which is shown as 104e. The relatively short one of the opposing parallel sides is preferably top surface 104a.

Preferably, base 104 is formed of Zerodur glass about 4.5 mm thick that has been polished optically flat on top surface 104a and lapped to 1 $\mu$m flatness on bottom surface 104d. The upper face of the base is polished optically flat to better than 10 nm, masked and acid etched in a solution of 2 HF(48%):1 HCl(70%) to produce a small flat mesa 604 above top surface 104a of approximately 10 $\mu$m height. After etching, the blank is sliced apart, using a high speed diamond wheel saw and a Vee-cutter to create the trapezoidal cross section. First and second thin film conductive coatings 610, 612 are then vacuum deposited on base 104. First conductive coating 610 is deposited on top surface 104a as shown at 610a, to form the conductive base portion. First conductive coating 610 extends onto first side surface 104c to produce a first electrical pad 610b. Second conductive coating 612 extends from the top of mesa 604 at 612a, in electrical contact with cantilever 106, across the mesa 604 at 612b and onto a second portion of the first side surface 104c to form a second electrical pad 612c. The first and second conductive coatings are about 1000 Å thick aluminum coatings.

A diamond machined glass cantilever beam 106 is prepared by depositing conducting thin films onto both opposing faces thereof. Cantilevers are made from 100 $\mu$m-thick silica plates which are cut to shape using high-speed CNC diamond grinding. The silica (No. 0 microscope cover slips) is machined using a 50,000 rpm airspindle on a CNC milling machine, with 1mm diameter diamond grinding tools. After machining, the glass is cleaned and a 1000 Å thick aluminum electrode is vacuum deposited by evaporation. Chromium or other metals may be used. Flatness of these cantilevers is approximately 1.6 $\mu$m peak-to-valley.

Contact to the cantilever electrode is made by placing it onto the coating portion 612a on the Zerodur mesa 604. The condition of the electrode gap is monitored. If the gap meets specifications the cantilever is clamped in place and secured in place with a small fillet of two-part epoxy around the edges. A diamond stylus is then applied to the tip of the cantilever with cyanoacrylate or any other suitable adhesive. No further adjustments of the probe 102 are necessary once assembled in this manner.

Cantilever 106 and electrode 612a on mesa 604 form a parallel plate capacitor between conductive base portion 610a and cantilever 106. The dimensions of the cantilever 106 are preferably 7 mm by 1.5 mm in length and width and about 100 $\mu$m thick. The length and width dimensions of conductive base portion 610a are at least as large. The overlapping areas of cantilever 106 and conductive base portion 610a, in combination with the spacing of about 10 $\mu$m between cantilever 106 and base 104, trap a layer of air between the base 104 and cantilever 106. Mechanical damping of the cantilever beam is thereby provided, to reduce overshoot and oscillation.

Forces are detected by monitoring any distortions as a change in the capacitance between the base and cantilever electrodes. Constant force operation is obtained by servoing the actuator 110 to maintain a constant capacitance and therefore a constant force signal at the tip sensor. Therefore, if the tip 108 is in contact with a surface, there will be a constant force at the interface. Accordingly, motion of the surface will cause the actuator 110 to follow at a nominally constant force value. This contrasts sharply from conventional stylus based instruments that will track a surface by responding to force variations at the probe/specimen interface due to stylus stiffness and dynamic interactions.

Still referring to FIG. 6, the details of holder 206 will now be described. First and second electrical contacts 620 and 622, respectively, electrically contact pads 610b and 612c, respectively. The contact points may be machined to form spherical kinematic contact (not shown). The slide 626 includes a spring plunger arrangement (not shown) to ensure good electrical contacts. Slide 626 includes a shoulder 628 for cooperatively mating with the second surface 104b of base 104. The spring/plunger arrangement resiliently urges shoulder 628 against second surface 104b.

Accordingly, the probe 102 is mounted in holder 206 by sliding it into the holder 206 in the direction shown by arrow 630, i.e. transverse to the trapezoidal cross section of base 104. As it is mounted, it is forced against the two electrical contacts 620 and 622 and downwards against the actuator head 510 which acts as the base of the holder. Sliding of the probe 102 is continued until it reaches a spherical contact (not shown) on the rear face of slide 626, so that electrical contact with the two pads 610b, 612c is automatically made. Accordingly, a worn or defective probe 102 may be easily removed and replaced, with automatic mechanical alignment and electrical connection of the inserted replacement probe being provided.

Figure 7:
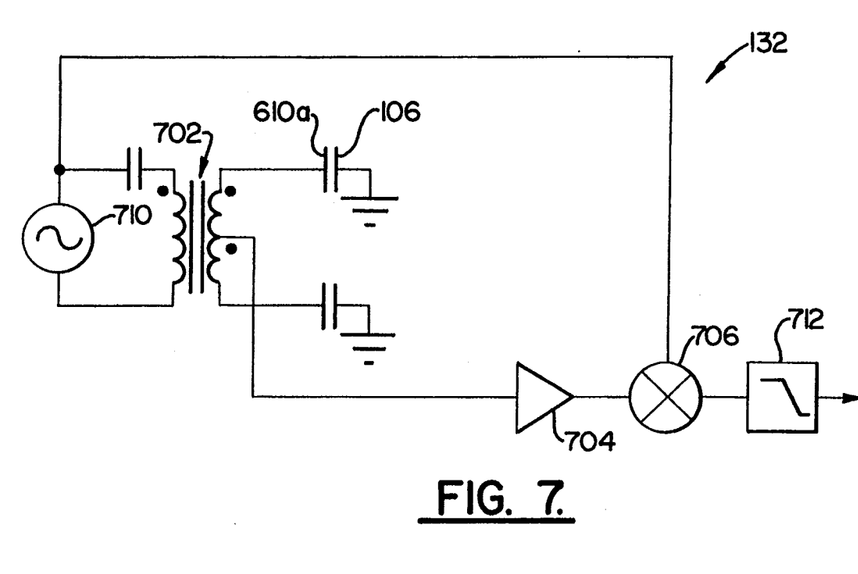
FIG. 7 is a schematic block diagram of a capacitance sensor for the surface profiling apparatus of FIG. 1.

The displacements of the cantilever beam 106 are monitored by a high resolution capacitance gage 132 (FIG. 1) with nanometer resolution. FIG. 7 is an electrical schematic diagram of the capacitance gage 132. This capacitance gage allows the cantilever to be grounded, acting as a shield to the excited electrode plate on the probe base, and also reduces the electrostatic effects of charge build up.

Referring now to FIG. 7, the capacitance gage 132 is a high frequency adaptation of a ratio transformer bridge. A torroidal core transformer 702 is provided, using miniature, flexible, coaxial cable for the secondary winding, to provide continuous electrostatic shielding from the preamplification stage to the probe itself. The transimpedance amplifier 704 and phase sensitive detector 706 utilize wide bandwidth operational amplifiers recently introduced for the high definition video industry. An excitation frequency 710 near 500 kH was selected for increased bridge current and the ease with which the final output signal can be demodulated using a simple RC low pass filter 712 with a 1 kH cutoff, introducing minimal phase shift within the system bandwidth.

Alternatively, a Queensgate Instruments capacitance bridge may be used to measure cantilever deflections. This AC bridge, with an excitation frequency of about 20 kHz is designed to utilize 20-pF capacitances. Noise power spectral density is specified as 1 $\mu$V per root Hz, with a bandwidth of 1 kHz. Stability of this or any capacitance bridge is only as good as its reference capacitor. For the ultimate in stability, a Zerodur reference capacitor may be utilized. This capacitor is produced by polishing the faces of two Zerodur disks to a flatness of better than 20 nm. A step is then etched into the surface and aluminum electrodes deposited in the recess. To reduce oxidation, a thin, 50-nm film of silica is deposited over the aluminum electrodes. The capacitor is then formed by optically contacting the two Zerodur blanks. The capacitance thus produced is dependent upon the combined depth of the etched steps, electrode area, and air dielectric. Both sensor and reference capacitor have small air gaps, open to ambient, that allow the capacitance bridge to compensate for changes in pressure or humidity, which are effectively nulled out of the measurement.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. Apparatus for measuring a surface profile comprising:
   a base including a conductive base portion;
   a conductive cantilever beam positioned in spaced apart relation from said base, said conductive cantilever beam including a fixed end and a free end;
   a stylus tip on said conductive cantilever beam adjacent said free end, for movement by a surface profile;
   actuating means, mechanically coupled to said base, for moving said base relative to said free end of said conductive cantilever beam;
   constant spacing maintaining means, electrically connected to said conductive base portion and to said conductive cantilever beam, for maintaining constant spacing between said base and said free end of said conductive cantilever beam as said stylus tip moves across the surface profile, by controlling displacement of said actuating means; and
   displacement indicating means, for producing an electrical signal responsive to displacement of said actuating means, said electrical signal providing measurement of the surface profile;
   wherein said base includes a top surface and first and second side surfaces on opposite ends of said top surface, said base further including a mesa on said top surface;
   wherein said fixed end of said conductive cantilever beam is fixedly attached to said mesa, said conductive cantilever beam extending adjacent said top surface in spaced apart relation therefrom; and
   wherein said base further includes a first conductive coating on said top surface and extending onto a first portion of said first side surface to produce a first electrical pad, and a second conductive coating extending from said conductive cantilever beam across said mesa and onto a second portion of said first side surface to produce a second electrical pad, said first and second electrical pads being electrically connected to said constant spacing maintaining means;
   the apparatus further comprising holding means, including a shoulder for cooperatively mating with said second side surface, and means for cooperatively mating with said first side surface so as to electrically connect to said first and second electrical pads.

2. The apparatus of claim 1 wherein said conductive base portion is a conductive base surface, and wherein said conductive cantilever beam is a cantilever beam having a pair of opposing faces extending over said conductive base surface and positioned in spaced apart relation therefrom, at least one of said pair of opposing faces being a conductive cantilever face.

3. The apparatus of claim 2 wherein said conductive base surface and said conductive cantilever face define a predetermined overlapping area, said predetermined overlapping area being sufficiently large, and the spacing between said conductive base surface and said conductive cantilever face being sufficiently small, so as to trap a layer of air therebetween to provide mechanical damping to said cantilever beam upon movement of said stylus tip by a surface profile.

4. The apparatus of claim 1 wherein said displacement indicating means comprises a capacitor having a pair of plates, at least one of which is coupled to said actuating means.

5. The apparatus of claim 1 wherein said actuating means is a piezoelectric actuator.

6. The apparatus of claim 5 wherein said displacement indicating means comprises a capacitor having a pair of plates, at least one of which is coupled to said piezoelectric actuator.

7. The apparatus of claim 6 wherein said capacitor is mounted internal to said piezoelectric transducer.

8. The apparatus of claim 1 wherein said constant spacing maintaining means comprises:

capacitive gaging means, electrically connected to said conductive base portion and to said conductive cantilever beam;

electronic controlling means, electrically connected to said capacitive gaging means; and actuator controlling means, electrically connected to said electronic controlling means, said actuator controlling means being electrically connected to said actuating means.

9. The apparatus of claim 1 further comprising data acquisition means, electrically connected to said displacement indicating means, for processing said electrical signal.

10. The apparatus of claim 1 further comprising means for moving a specimen having a surface profile, relative to said stylus tip.

11. The apparatus of claim 1 wherein said holding means further comprises means for resiliently urging said shoulder against said second surface.

12. The apparatus of claim 1 wherein said means for cooperatively mating with said first side surface comprises first and second electrical contacts, positioned in said holding means so as to cooperatively mate with said first side surface and electrically contact a respective first and second electrical pad.

13. Apparatus for measuring a surface profile comprising:

a base including a conductive base portion;

a conductive cantilever beam positioned in spaced apart relation from said base, said conductive cantilever beam including a fixed end and a free end;

a stylus tip on said conductive cantilever beam adjacent said free end, for movement by a surface profile;

actuating means, mechanically coupled to said base, for moving said base relative to said free end of said conductive cantilever beam;

constant spacing maintaining means, electrically connected to said conductive base portion and to said conductive cantilever beam, for maintaining constant spacing between said base and said free end of said conductive cantilever beam as said stylus tip moves across the surface profile, by controlling displacement of said actuating means; and displacement indicating means, for producing an electrical signal responsive to displacement of said actuating means, said electrical signal providing measurement of the surface profile;

wherein said base includes a top surface and first and second side surfaces on opposite ends of said top surface, said base further including a mesa on said top surface;

wherein said fixed end of said conductive cantilever beam is fixedly attached to said mesa, said conductive cantilever beam extending adjacent said top surface in spaced apart relation therefrom;

wherein said base further includes a first conductive coating on said top surface and extending onto a first portion of said first side surface to produce a first electrical pad, and a second conductive coating extending from said conductive cantilever beam across said mesa and onto a second portion of said first side surface to produce a second electrical pad, said first and second electrical pads being electrically connected to said constant spacing maintaining means; and wherein said substrate is of trapezoidal cross section and includes a pair of opposing parallel sides, a pair of opposing nonparallel sides and a pair of opposing end faces, said top surface being one of said pair of opposing parallel sides and said first and second surfaces being said pair of opposing nonparallel sides.

14. The apparatus of claim 13 wherein said pair of opposing parallel sides is a first relatively short side and a second relatively long side, and wherein said one of said pair of opposing parallel sides is said first relatively short side.

15. The apparatus of claim 13 wherein said holding means further includes a base surface, for mating with the other of said parallel sides, such that said substrate is slidably retained in said holding means.

16. Apparatus for measuring a surface profile comprising:

a base having a top surface and first and second side surfaces on opposite ends of said top surface, said base further including a mesa on said top surface;

a conductive cantilever beam, having a fixed end and a free end, said fixed end being fixedly attached to said mesa, said conductive cantilever beam extending over said top surface in spaced apart relation therefrom;

a stylus tip on said conductive cantilever beam, adjacent said free end;

a first conductive coating on said top surface and extending onto a first portion of said first side surface to produce a first electrical pad;

a second conductive coating extending from said fixed end of said conductive cantilever, across said mesa and onto a second portion of said first side surface to produce a second electrical pad, said first and second electrical pads producing an electrical signal upon electrical energization thereof in response to displacement of said stylus tip by a surface profile; and holding means, including a shoulder for cooperatively mating with said second side surface, and means for cooperatively mating with said first side surface so as to electrically connect to said first and second electrical pads.

17. The apparatus of claim 16 wherein said holding means further comprises means for resiliently urging said shoulder against said second surface.

18. The apparatus of claim 16 wherein said means for cooperatively mating with said first side surface comprises first and second electrical contacts, positioned in said holding means so as to cooperatively mate with said first side surface and electrically contact a respective first and second electrical pad.

19. The apparatus of claim 18 further comprising actuating means, mechanically coupled to said base, for moving said base relative to said free end of said conductive cantilever beam;

constant spacing maintaining means, electrically connected to said first and second electrical contacts, for maintaining constant spacing between said base and said free end of said conductive cantilever beam as said stylus tip moves across the surface profile, by controlling displacement of said actuating means; and displacement indicating means, for producing an electrical signal responsive to displacement of said actuating means, said electrical signal providing measurement of the surface profile.

20. The apparatus of claim 19 wherein said top surface and said conductive cantilever beam define a predetermined overlapping area, said predetermined overlapping area being sufficiently large, and the spacing between said top surface and said cantilever beam being sufficiently small, so as to trap a layer of air therebetween to provide mechanical damping to said conductive cantilever beam upon movement of said stylus tip by a surface profile.

21. The apparatus of claim 19 wherein said displacement indicating means comprises a capacitor having a pair of plates, at least one of which is coupled to said actuating means.

22. The apparatus of claim 19 wherein said actuating means is a piezoelectric actuator.

23. The apparatus of claim 22 wherein said displacement indicating means comprises a capacitor having a pair of plates, at least one of which is coupled to said piezoelectric actuator.

24. The apparatus of claim 23 wherein said capacitor is mounted internal to said piezoelectric transducer.

25. Apparatus for measuring a surface profile comprising:
- a base having a top surface and first and second side surfaces on opposite ends of said top surface, said base further including a mesa on said top surface;
- a conductive cantilever beam, having a fixed end and a free end, said fixed end being fixedly attached to said mesa, said conductive cantilever beam extending over said top surface in spaced apart relation therefrom;
- a stylus tip on said conductive cantilever beam, adjacent said free end;
- a first conductive coating on said top surface and extending onto a first portion of said first side surface to produce a first electrical pad; and
- a second conductive coating extending from said fixed end of said conductive cantilever, across said mesa and onto a second portion of said first side surface to produce a second electrical pad, said first and second electrical pads producing an electrical signal upon electrical energization thereof in response to displacement of said stylus tip by a surface profile;

wherein said substrate is of trapezoidal cross section and includes a pair of opposing parallel sides, a pair of opposing nonparallel sides and a pair of opposing end faces, said top surface being one of said pair of opposing parallel sides and said first and second surfaces being said pair of opposing nonparallel sides.

26. The apparatus of claim 25 wherein said pair of opposing parallel sides is a first relatively short side and a second relatively long side, and wherein said one of said pair of opposing parallel sides is said first relatively short side.

27. The apparatus of claim 25 wherein said holding means further includes a base surface, for mating with the other of said parallel sides, such that said substrate is slidably retained in said holding means.

* * * * *

UNITED STATES PATENT AND TRADEMARK OFFICE
CERTIFICATE OF CORRECTION

PATENT NO. : 5,450,746
DATED : September 19, 1995
INVENTOR(S) : Howard et al.

It is certified that error appears in the above-identified patent and that said Letters Patent is hereby corrected as shown below:

On title page, item

[75] Inventors:

Add second inventor: --Stuart T. Smith, Earlsdon, England--.

[56] References Cited:

Under Other Publications

Reference 2, "mar. 1991" should be --Mar. 1991--.

Reference 3, "Force-Beam" should be --Force-Balance--.

Signed and Sealed this

Twenty-sixth Day of March, 1996

Attest:

BRUCE LEHMAN

Attesting Officer  Commissioner of Patents and Trademarks